United States Patent [19]

Thompson et al.

[11] Patent Number: 5,577,299
[45] Date of Patent: Nov. 26, 1996

[54] QUICK-RELEASE MECHANICAL KNOT APPARATUS

[76] Inventors: Carl W. Thompson, 299 E. 100 North; Carl R. Foster, 175 S. 1150 West, both of Hurricane, Utah 84737

[21] Appl. No.: 296,664

[22] Filed: Aug. 26, 1994

[51] Int. Cl.$^6$ ............... A44B 21/00; F16G 11/00
[52] U.S. Cl. ............ 24/131 C; 24/115 H; 24/115 K; 289/1.2; 289/18.1
[58] Field of Search .............. 289/17, 18.1, 1.2, 289/13, 15; 24/115 K, 115 R, 128, 129 R, 131 R, 131 C, 129 C, 115 H, 129 W; 16/114 B, 202, 207; 267/166, 167

[56] References Cited

U.S. PATENT DOCUMENTS

| | | | |
|---|---|---|---|
| 525,770 | 9/1894 | Parker | 24/131 C |
| 782,657 | 2/1905 | Hubert | 24/131 C |
| 1,073,226 | 9/1913 | Freeman | 24/131 R |
| 1,375,119 | 4/1921 | Stephen | 24/129 C |
| 1,599,040 | 9/1926 | Clisby | 24/129 C |
| 1,718,641 | 6/1929 | Forman | 24/131 R |
| 2,351,726 | 6/1944 | Wallace | 267/166 |
| 2,387,264 | 10/1945 | Holland | 267/166 |
| 3,069,739 | 12/1962 | Jorgenson et al. | 24/129 R |
| 3,085,823 | 4/1963 | De Baere | 289/17 |
| 3,296,670 | 1/1967 | Burnett | 24/131 R |
| 3,438,098 | 4/1969 | Grabner | 24/131 R |
| 3,728,762 | 4/1973 | Hogg | 24/129 |
| 4,014,570 | 3/1977 | Ruggles et al. | 289/17 |
| 4,077,619 | 3/1978 | Borlinghaus | 267/166 |
| 4,361,977 | 12/1982 | Lawler | 24/131 C |
| 4,572,555 | 2/1986 | Henderson, Jr. | 289/17 |
| 4,815,772 | 3/1989 | Lizarraga | 289/1.5 |
| 4,864,956 | 9/1989 | Onstwedder, Jr. | 267/69 |
| 4,872,240 | 10/1989 | Spinner et al. | 16/114 B |
| 4,918,785 | 4/1990 | Spinner et al. | 16/114 B |
| 5,050,813 | 9/1991 | Ishikawa et al. | 24/129 R |
| 5,454,150 | 10/1995 | Hinke et al. | 267/166 |

*Primary Examiner*—Michael A. Neas
*Attorney, Agent, or Firm*—Gary D. E. Pierce; Berne S. Broadbent

[57] ABSTRACT

A quick-release mechanical knot device for use in securing objects together having a novel means for quickly and safely releasing the mechanical knot device from the body of a rope or tether regardless of the amount of tension or load strain acting on the rope. The device comprises a semi-rigid elongated stock member having at least two circular orifices formed at opposing ends of a curvilinear intermediate portion. The first and second orifices are substantially perpendicular to the linear length of the stock member and formed with a substantially parallel and concentric axis to one another. A leading end of a rope is inserted through the first and second circular orifices of the stock member and wrapped around a stationary or movable object to form a hitch. The leading end of the rope is then placed between the curvilinear intermediate portion of the stock member and the portion of the rope passing between the first and second orifices to form a capture for the portion of the rope therebetween. After forming a loop, the leading end of the rope is passed back through the intermediate portion of the stock member and the capture and maintained therebetween. To release the holding integrity of the stock member, the leading end of the rope is pulled tightly to remove the portion of the rope secured between the intermediate portion of the stock member and the rope capture thus freeing the retention of the bight formed in the rope.

8 Claims, 2 Drawing Sheets

QUICK-RELEASE MECHANICAL KNOT APPARATUS

BACKGROUND

1. The Field of the Invention

This invention relates to knot-tying devices and, more particularly, to a novel mechanical knot device and methods which may be used to securely fasten objects together and which is capable of being quickly and safely released from the body of a rope or tethering material experiencing tension or load strain.

2. The Background Art

Throughout history, the ability to secure one article to another has been a valuable and extremely important skill. One of the earliest known methods for securely fastening objects together involved the use and manipulation of plant vines. For example, huts were traditionally constructed by interweaving freshly cut vines around branches and tree limbs of various lengths and thicknesses. Securing the branches and limbs together, the vines provided a means for restricting any subsequent movement of the branches and limbs in relation to the overall structure of the shelter or hut. Furthermore, plant vines provided necessary structural support to the integrity of the hut once the vines dried in their prearranged configurations.

Today, ropes are customarily used when fastening one object securely to another. Typically, ropes are made from either natural or synthetic fibers. When a load or stress is first applied to any fiber rope, the rope stretches in a proportional degree to the magnitude of the load applied. Normally, the load stretch is referred to as the strain on a rope. The strength and integrity of a rope to withstand a load strain generally depends upon the size of the rope, the properties and characteristics of the fiber strands of the rope, and the technique by which the fiber strands are braided or interlaced together to form the rope.

Traditionally, a rope formed from natural fibers is typically produced from such plants as manila, sisal and hemp. A rope constructed from synthetic fibers, on the other hand, is generally formed from elastic synthetic materials or polymers, such as nylon and polypropylene.

Synthetic ropes are typically stronger than natural fiber ropes, with nylon being about 2½ times the strength of manila. In addition, synthetic ropes are generally lighter and have greater tolerances for fatigue and resistance to fiber abrasions. Synthetic ropes also have a higher breaking strength (wet or dry), greater elasticity and tensile recovery, superior absorption abilities under impact and shock loads, greater flexibility, and are ultimately better able to resist rotting than ropes fabricated from natural fibers.

Since ropes are being increasingly utilized for numerous recreational and occupational purposes, such as, for example, yachting, construction rigging, ranching and mountain climbing, a number of knot-tying configurations have been developed to demonstrate strength and holding integrity. When forming a knot configuration in a rope, the principal objectives include providing security against slippage, suitability of the particular knot configuration to the circumstances and strength or holding integrity of the rope. In this regard, the proper fastening means (a knot, bend or hitch) must be carefully selected for the particular task and then tied correctly to obtain the maximum holding strength needed from the knot formed in the rope. Accordingly, conventional knot-tying has become essential, if not invaluable to the effective performance of a rope when securing objects together.

Several inherent problems, however, are associated with the use of conventional knots. For instance, many of the knots recognized as providing the greatest load carrying capacities generally require the user to possess an expertise in knot-tying and an ability to distinctly remember from the hundreds of various knot configurations which knot works best under which particular set of circumstances.

In some situations, the similarities between the various knot-tying forms and configurations may cause a user frustration when carefully deliberating the specific steps to follow when tying the appropriate conventional knot to provide the necessary holding integrity as required by the inherent factors of the particular conditions. Various types of conventional knots requiring specific tying configurations include, for example, the bowline knot, the double blackwall hitch, the catspaw, the clove hitch, the half-hitch, the square knot, the sheepshank, the rolling hitch, the timber hitch and the overhead knot.

Another important property of a rope is its ability to endure dramatic bending under load conditions. Repeated bending of a rope is commonly referred to as flexing endurance and its effect on the performance and strength of the rope is an important factor concerning load carrying capacity.

It has been well documented by those skilled in the art that tying a knot in a rope or severely bending the rope may cause a significant reduction in the strength and load carrying capacity of the rope. This reduction in load carrying capacity is directly proportional to the tightness of the knot or the sharpness of the bends in the rope. Severe bends or knots tied in the body of a rope, therefore, may significantly interfere with the stress distribution of the fibers which make up the integral strands of the rope.

Typically, a rope fastening means (knot, bend or hitch) formed in the body of a rope is normally unable to display the same relative strength and load carrying capacity of the original rope without bends or knots formed therein. Moreover, the bending of a rope when forming a knot or hitch may cause the outside fibers to carry more than their share of the load strain acting on the rope. Accordingly, the resultant stretching of the fibers may permanently weaken the holding integrity of the rope. In this regard, when a failure occurs, the outside fibers are the first to break, followed by the inside fibers.

Regarding the load carrying capacity of a rope, with a straight pull, a rope will give 100% efficiency. Tie a knot in the same rope or bend it severely and the load carrying capacity of the rope is significantly weakened approximately 50%. For example, a bowline knot and a square knot formed in the body of a rope can dramatically reduce the strength and load carrying capacity of the rope by 40% and 50%, respectively. A sharp bend in a rope may also result in a 25% reduction in rope strength. Tying a knot or severely bending a rope, therefore, has multiple disadvantages which may significantly reduce the overall effectiveness of the rope. Consequently, the formation of a conventional knot in a rope may cause serious fatigue to the fibers of the rope, thereby shortening the usefulness and life expectancy of the rope.

Another practical disadvantage with using conventional knots relates to the problems associated with exposing a rope to excessive amounts of pulling forces or tension which may cause a knot formed in the body of the rope to become severely constricted and compressed, thus making it nearly impossible to untie the knot without cutting the rope. When this occurs, the knot generally becomes permanently fixed within the body of the rope, until such time as the rope is cut and the conventional knot configuration removed. Consequently, having to cut the rope to release the holding integrity of the knot, may result in significant rope waste.

A number of attempts have been made by those skilled in the art to overcome many of the foregoing disadvantages associated with tying conventional knots. For example, to help alleviate the prerequisite that a user manifest a degree of technical expertise and specialized know-how to tie a knot with holding integrity, prior art mechanical knot-tying guides were developed. Knot-tying guides typically provide a set of tying instructions printed directly on the exterior surface of the guide device to assist the user in forming a particular conventional knot.

Although the use of knot-tying guides has provided users with an effective resource when tying certain conventional knots, mechanical knot-tying devices of the prior art typically require the user to acquire a certain amount of practice or experience with the device before the knot-tying guide is generally helpful. In addition, mechanical knot-tying guides are normally limited in their use to a very specific knot configuration. For example, knot-tying guides were developed by those skilled in the art to assist users in forming conventional necktie knots, such as the windsor or four-in-hand knot. These prior art knot-tying guides are, however, strictly limited in fundamental application to tying a specific knot configuration for a necktie.

As another example, because the bowline knot is known for its holding integrity and usefulness, prior art mechanical knot-tying guides were developed to assist a user in properly tying a bowline knot without requiring the user to possess the technical know-how and expertise generally required for tying a bowline knot. Notwithstanding the usefulness of bowline guide devices, in order for the knot-tying guide to be beneficial, the user is typically required to carry the bulky and cumbersome device to those locations where objects are to be secured to one another.

Other practical disadvantages with bowline knot-tying guides have also emerged, such as the difficulty for a user to maintain control over a moving object while having to dedicate almost entire concentration to the instructional placement of the rope into the various grooves provided by the device to properly construct an adequate bowline knot that demonstrates sufficient holding integrity. Despite the effectiveness of knot-tying guides offered by the prior art, the influence and effect of a bowline knot on a rope traditionally reduces the strength and load carrying capacity of the rope by nearly 40%. And, since bowline knots are often preferred over other conventional knots when tethering large objects, significant problems may arise if the properties of the rope, such as its fiber strength and load carrying capacity, are not seriously taken into consideration by the user.

When tying a string or rope around a box or package, it is often difficult, if not impossible, for one person to tie the knot alone. Accordingly, those skilled in the art developed various mechanical knot-tying contrivances to eliminate the need for assistance from another person to tie a knot displaying holding integrity. Unfortunately, the prior art knot-tying contrivances are generally bulky in size and typically not very portable. Moreover, a conventional knot formed in the rope or cordage with these knot-tying contrivances usually becomes a permanent fixture within the body of the rope or cordage. In order to remove the knot, the cordage is typically cut and the knot retied.

Other prior art mechanical knot-tying devices were also developed to offer improvements to the methods used by fisherman when releasing fish from fish stringers. One such prior art device involves the method of tightly wedging a string or cord between a rigid circular loop which is formed in the center of an elongated wire and underneath a portion of the overlaying string.

By removing the wedged portion of the string from its position, the fish stringer device allows the fisherman to dislodge the fish from the device without having to rethread the string through the fish. The fish are unable, however, to be dislodged from the fishing line if even a moderate amount of tension is acting against the body of the string. Accordingly, the string wedged between the two surfaces may become further wedged therebetween presenting a potential problem regarding serious fiber abrasions and fatigue to the string, thus weakening the load carrying capacity and strength of the string, especially in the area where the string or rope is tightly wedged.

Consisting of a core of stranded metal fibers with a plastic protective coating, metal cables were later developed to provide greater durability and resistance from the weather as compared to conventional cordage. Pull cords, tennis net supports and clothes lines are a few examples of plastic coated metal cables of the prior art. A disadvantage, however, to using metal cables as a securing means is the general difficulty of effectively assembling two lengths of cable together to form a loop in the body of a cable for passing around an object to be fastened thereto. In this regard, tying a conventional knot in a cable has proven to be generally ineffective when it comes to providing load carrying capability due to the distinct properties and characteristics of a cable, such as thickness, a smooth surface and its relatively unyielding flexibility. In addition, a conventional knot formed in the body of a metal cable is typically unable to withstand high tension forces applied against the cable without the knot configuration unraveling and releasing.

Responding to the general inability of tying conventional knots in cables and the difficulty associated with securing cable assemblies together, prior art devices were developed providing alternative mechanical means for substantiating holding integrity between cables. For example, metal clamps were provided which were tightly fastened to the body of a cable by puncturing through the plastic coating of the metal cable and contacting the metal fibers. In this fashion, prior art metal clamps provide a form of resistance from slippage between multiple cables. The disadvantage, however, with cutting or puncturing a metal cable is that its fibers may become weakened and fatigued from the exposure to the elements of the weather, whereby permitting a form of damaging rust to generate on the metal fibers of the cable significantly affecting the overall strength and life of the cable. As an alternative to prior art metal clamps, mechanical knot devices comprising at least two figure-eight shaped metal rods that interact in association with one another and the body of at least one cable were developed to provide a solution to the damage caused by metal clamps to cable fibers. By interlacing the body of the metal cable through various openings in each of the figure-eight shaped rods, a knot assembly with holding integrity may generally be formed.

Although prior art metal rods are typically useful when manipulating plastic coated metal cables, the cost of producing is significantly double the cost of manufacturing a single mechanical knot due to the need of at least two figure-eight metal rods interacting together in combination with the cable to provide holding integrity. In addition, the mere act of interweaving the cable through the various openings in figure-eight shaped rods may further restrict the capacity of the cable to be quickly and safely released from the metal rods under any form of tension or load strain. Accordingly, any tension acting against the cable must be fully relaxed or the section of the cable interacting with the metal rods must be cut to release the restrictive hold of the mechanical knot device and knot configuration formed thereby.

Alleviating the dangers and drawbacks associated with alternating tensions and rope slackening caused by variations in load pressures typically having detrimental effects on the fastening ability of common hooking devices and spliced-end loops, another form of mechanical knot devices was developed consisting generally of a tubular support body through which the body of a rope may be inserted therethrough and tied into a restrictive knot configuration therearound. After passing the first end of the rope around a fixed or moveable object, the rope is typically tightly wrapped around the small diameter of the mechanical knot device at least two times and secured each time under the portion of the rope inserted through a slot formed in the elongated body of the tubular support. Once a knot configuration is formed around the tubular mechanical knot-tying device and an amount of tension or load strain is applied against the rope, the knot device positioned in the body of the rope generally becomes permanently fixed in the rope until the tension or strain acting on the rope is released, or the mechanical knot device is excised from the body of the rope.

Another significant disadvantage with tubular knot devices of the prior art is that the formation of the knot configuration requires sharp bends in the body of the rope to form a secure hold. Tightly wrapping the rope around the small tubular radius of the mechanical device is also likely to cause stress and fatigue to rope fibers and significantly reduce the overall strength and load carrying capacity of the rope. Furthermore, since one end of the rope is typically pushed through a milled slot formed in the body of the tubular member to provide a catchment for the knot configuration, the danger that a user's fingers might become caught in the opening of the slot when tension is suddenly applied against the body of the rope is clearly a serious concern for users of these prior art tubular mechanical knot devices.

BRIEF SUMMARY AND OBJECTS OF THE INVENTION

In view of the foregoing, it is a primary object of the present invention to provide a quick-release mechanical knot device and methods which may be used to securely fasten one object to another with sufficient holding integrity.

It is also an object of the present invention to provide a mechanical knot device which is capable of being quickly and safely released from the body of a rope experiencing tension or load strain.

Further, it is an object of the present invention to provide a quick-release mechanical knot device and methods which may be employed to securely fasten objects together without requiring the user to possess any special technical know-how or expertise in tying knots with holding integrity.

It is a still further object of the present invention to provide a quick-release mechanical knot device which does not significantly reduce the load carrying capacity or strength of a rope as a result of tightly compressed knots or severe bending stresses formed in the body of the rope.

It is likewise an object of the present invention to provide a quick-release mechanical knot device which is lightweight, portable, simple to manufacture and requires no complicated instructions to be printed on the exterior surface of the mechanical device.

Additionally, it is an object of the present invention to provide a quick-release mechanical knot device which does not promote fiber abrasions or rope fatigue, thus maintaining the strength and longevity of the rope.

Consistent with the foregoing objects, and in accordance with the invention as embodied and broadly described herein, a quick-release mechanical knot device is disclosed in one embodiment of the present invention as including a semi-rigid stock member having two circular orifices formed at opposing ends of a curvilinear intermediate portion. The first and second orifice of the stock member are substantially perpendicular to the linear length of the stock member and formed with substantially parallel concentric axis to one another.

A leading end of a tether material, preferably a rope, is introduced through the first and second circular orifices of the stock member and further wrapped around a stationary or movable object forming a hitch or bight for attachment thereto. The leading end of the rope is then placed between the curvilinear intermediate portion of the stock member and the portion of the body of the rope passing between the first and second orifices.

After forming a loop conformation, the leading end of the rope is passed back through the area between the intermediate portion of the stock member and the portion of rope transverse thereto passing through the first and second orifices of the stock member forming a capture for the portion of the rope engaged therebetween.

To quickly release the holding integrity of the bight formed in the body of the rope, the leading end of the rope is pulled taut, thereby releasing the portion of the rope secured between the curvilinear intermediate portion of the stock member and the rope capture. In this regard, the portion of the rope secured in combination with the structural design of the quick-release mechanical knot device of the present invention is capable of being quickly and safely released from the body of the rope.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENT

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 4, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
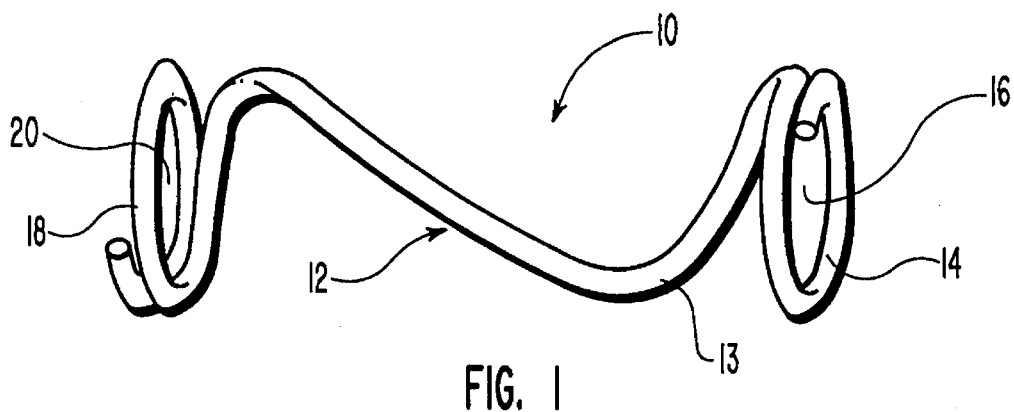
FIG. 1 is a perspective view illustrating one presently preferred embodiment of the quick-release mechanical knot device of the present invention.

The quick-release mechanical knot device of the present invention, generally designated at 10, is shown in its entirety in FIG. 1. As shown, the quick-release mechanical knot device 10 comprises a semi-rigid elongated stock member 12 preferably formed of a stainless steel wire to prevent rusting and ordinary corrosion. Other suitable materials, such as, for example, a durable polyethylene plastic, may also be used consistent with the objects and features of the present invention.

Extending the linear length of the stock member 12 is an elongated intermediate portion 13 preferably curvilinear in form and having an arcuate configuration. Formed at opposing ends 14, 18 of the intermediate portion 13 of the stock member 12 are substantially circular orifices 16 and 20, respectively. The distinctive curvilinear shape of the intermediate portion 13 of the stock member 12 helps to provide a concentric alignment between the first orifice 16 formed at the first end 14 of the stock member 12 and the second orifice 20 formed at the second end 18 of the stock member 12. It will be readily appreciated, however, that other Shapes or configurations of the orifices are possible.

Preferably, the first orifice 16 is integrally formed by rotating the first end 14 of the stock member 12 approximately 360 degrees to form a substantially spherical opening. In like manner, the second orifice 20 is integrally formed by rotating the second end 18 of the stock member 12 approximately 360 degrees to form a second substantially spherical opening. The second orifice 20 of the stock member 12, however, is formed in a diametrically opposite symmetrical configuration relating to the rotational formation of the first orifice 16.

Figure 4:
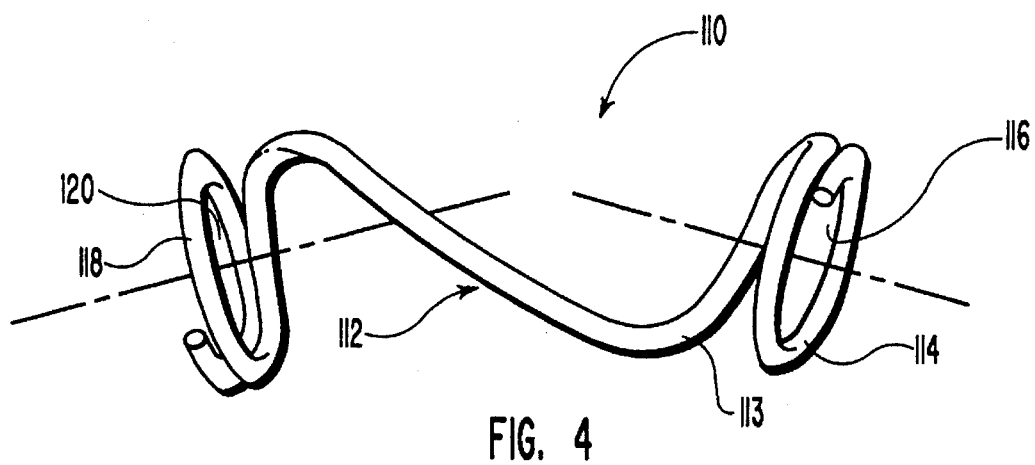
FIG. 4 is a perspective view illustrating an alternative preferred embodiment of the quick-release mechanical knot device of the present invention showing first and second ends of the stock member angularly disposed.

Being substantially perpendicular to the intermediate portion 13 of the stock member 12, the internal axis of the first orifice 16 at the first end 14 of the intermediate portion 13 is preferably parallel and disposed in concentric alignment with the internal axis of the second orifice 20 of the stock member 12. As shown in FIG. 4, an alternative preferred embodiment of the quick release mechanical knot device consists of a first orifice 116 at a first end 114 disposed in an angularly outward direction from the intermediate portion 113. A second orifice 120 is formed at a second end 118 of the stock member 112 and is preferably disposed at a substantially equivalent angle to that of the first orifice 116 with regard to the intermediate portion 113. It will be readily appreciated, however, that alternative angles of displacement are possible.

Since the first 16 and second orifice 20 of the present invention must conform to the size of a tether material 22, preferably a rope, to which the mechanical knot device 10 may be applied, it is anticipated that the annular diameters of the first orifice 16 and the second orifice 20 may be radially enlarged to compensate for various rope 22 sizes, such as, for example, ⅝ inch, ½ inch or ¾ inch. Other suitable tethering materials, such as, for example, cordage, string, or cable may also be used consistent with the objects and features of the present invention.

Figure 2:
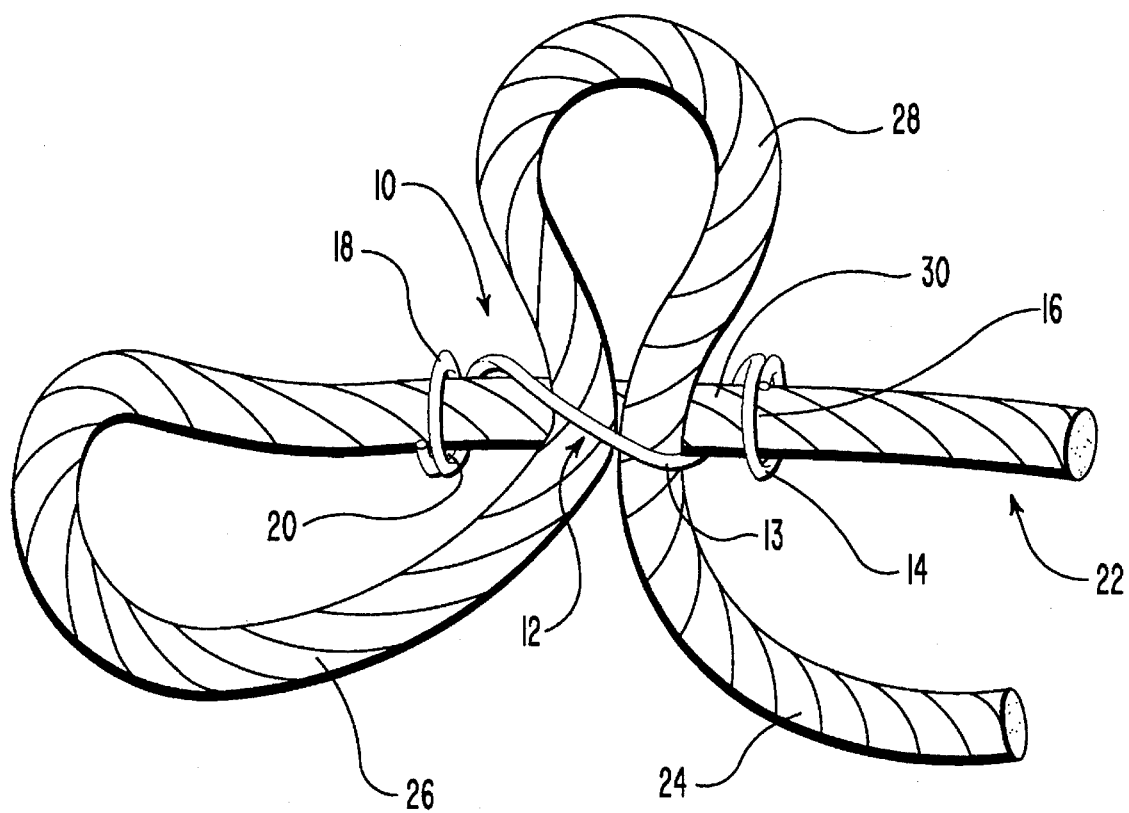
FIG. 2 is a perspective view of the embodiment of FIG. 1 showing the quick-release mechanical knot device interacting with a rope to form a means for securing objects together.
Figure 3:
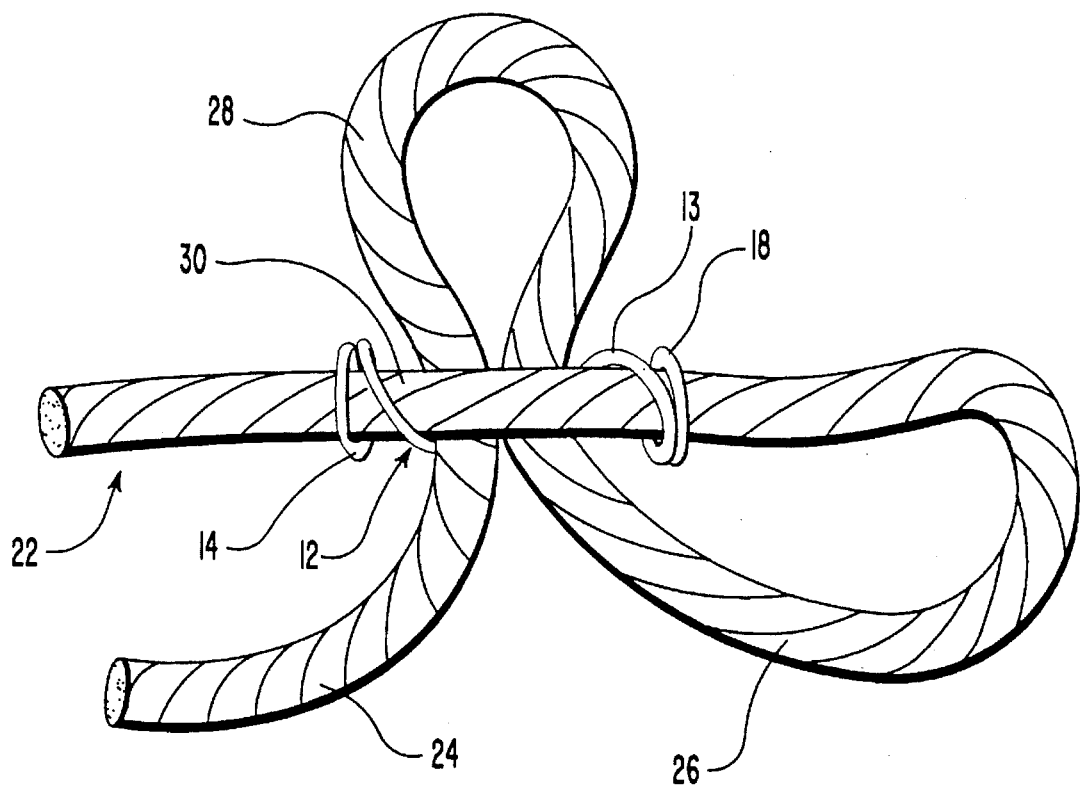
FIG. 3 is a perspective view of the embodiment of FIG. 2 illustrating the opposite side of the quick-release mechanical knot device interacting with the body of the rope.

As generally shown in FIGS. 2 and 3, the first orifice 16 and the second orifice 20 at opposing ends 14, 18 of stock member 12 are substantially transverse dimensionally across the linear length of the intermediate portion 13 of the stock member 12 providing a means for inhibiting fatigue and fiber abrasions to the body of the rope 22 as a result of excessive wearing. In addition, the quick-release mechanical knot device 10 of the present invention preferably provides an overall substantially smooth surface, which, as used herein, means that the surface of the stock member 12 is substantially free from roughness and projections which could cause damage to the fibers of an engaging rope 22.

Referring to FIG. 2, the preferred method for employing the quick-release mechanical knot device 10 of the present invention, involves a leading end 24 of the rope 22 being preferably inserted through the annular opening of the first orifice 16 at the first end 14 of the stock member 12, passed adjacent the linear length of the intermediate portion 13, and further inserted through the annular opening of the second orifice 20 at the opposing end 18 of the stock member 12. After passing the leading end 24 of the rope 22 through the second orifice 20 of the stock member 12, the rope 22 is generally wrapped substantially around a stationary or moveable object creating a structural hitch or bight 26 in the rope 22 for securely fastening an object(s) thereto.

The leading end 24 of the rope 22 is thereafter introduced between the curvilinear intermediate portion 13 of the stock member 12 and the section of rope 22 supported by and passed through the first orifice 16 and the second orifice 20 of the stock member 12, as best shown in FIGS. 2 and 3. The leading end 24 of the rope 22 is formed into a loop 28 and passed back through the area between the curvilinear intermediate portion 13 of the stock member 12 and the rope capture 30 to provide a means for securely maintaining the body of the rope 22 therebetween. The leading end 24 of the rope 22 is then pulled taut to provide a means for retention on the bight 26.

To quickly and safely release the holding integrity of the bight 26 of the rope 22, whether under tension or not, the leading end 24 of the rope 22 is pulled to release the portion of the rope 22 forming the loop 28 secured between the curvilinear intermediate portion 13 of the stock member 12 and the rope capture 30, thus freeing the restrictive hold of the quick-release mechanical knot device 10. In this regard, the structure of the quick-release mechanical knot device 10 in combination with the rope 22 and method for forming a simple knot configuration provides a novel means for securely fastening objects together in circumstances, such as, for example, yachting, construction rigging, mountain climbing and restraining livestock.

From the above discussion, it will be appreciated that the present invention provides a quick-release mechanical knot device and methods which provide a novel means for quickly and safely releasing the holding integrity of a rope regardless of the tension or load strain acting on the body of the rope. Unlike prior art mechanical knot devices, the present invention does not involve tightly compressed knots or severe bending stresses formed in the body of the rope which would significantly reduce the load carrying capacity and strength of the rope.

Additionally, the present invention provides a quick-release mechanical knot device and methods which may be employed to securely fasten objects together without requiring the user to possess any special technical know-how or expertise in tying knots with holding integrity. Moreover, the quick-release mechanical knot device of the present invention is light weight, portable, simple to manufacture and does not promote fiber abrasions or rope fatigue when engaged with the rope, thereby maintaining the strength and longevity of the rope. Based on the foregoing, the present invention thus provides significant advantages over prior art mechanical knot devices now in use.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A combination for securing a tethering material to a support member or other structure, comprising:

a mechanical knot device, comprised of:
     a stock member having a first end and a second opposing end;
     a first orifice disposed at said first end of said stock member and having an opening formed therein;
     a second orifice disposed at said second end of said stock member and having an opening formed therein, said opening of said second orifice being substantially aligned axially with said opening of said first orifice; and
     an intermediate portion extending between said first end and said second end, said intermediate portion having a uniform curvilinear configuration; and a tethering material including a leading end, a second opposing end and two loop portions, said leading end being introduced through said first and second orifices of said stock member, said first loop portion passing outwardly from said orifices and extending substantially around said support member, said second loop portion being received between said intermediate portion of the stock member and said leading end of said tethering material.

2. A combination for securing a tethering material to a support member or other structure as defined in claim 1 wherein said first loop portion comprises a retaining bight.

3. A combination for securing a tethering material to a support member or other structure as defined in claim 1 wherein said second loop portion comprises a capture.

4. A combination for securing a tethering material to a support member or other structure as defined in claim 1 wherein said first orifice and said second orifice of said stock member are formed having a substantially annular conformation adapted to receive said tethering material.

5. A combination for securing a tethering material to a support member of other structure as defined in claim 1 wherein said tethering material comprises a rope.

6. A combination for securing a tethering material to a support member or other structure as defined in claim 1 wherein mechanical knot device is comprised of stainless steel wire.

7. A combination for securing a tethering material to a support member or other structure as defined in claim 1 wherein said first orifice is substantially parallel to and disposed in concentric alignment with said second orifice.

8. A combination for securing a tethering material to a support member or other structure as defined in claim 1 wherein said first orifice and said second orifice being angularly disposed in relation to said intermediate portion of said stock member.

* * * * *